(12) United States Patent
Roarty et al.

(10) Patent No.: US 11,378,226 B2
(45) Date of Patent: Jul. 5, 2022

(54) FOLDING MONITOR STAND

(71) Applicant: Bloomberg Finance L.P., New York, NY (US)

(72) Inventors: Sean Roarty, Ossining, NY (US); Chris Brown, Oakville (CA); Vito Illuzzi, Staten Island, NY (US); John Harmen, Burlington (CA); Al Castagna, Etobicoke (CA)

(73) Assignee: Bloomberg Finance L.P., New York, NY (US)

( * ) Notice: Subject to any disclaimer, the term of this patent is extended or adjusted under 35 U.S.C. 154(b) by 0 days.

(21) Appl. No.: 16/547,840

(22) Filed: Aug. 22, 2019

(65) Prior Publication Data

US 2019/0376641 A1    Dec. 12, 2019

Related U.S. Application Data (63) Continuation of application No. 15/419,465, filed on Jan. 30, 2017, now Pat. No. 10,436,378.

(51) Int. Cl.
*H05K 5/00*     (2006.01)
*F16M 11/08*    (2006.01)
*F16M 11/20*    (2006.01)

(52) U.S. Cl.
CPC ......... *F16M 11/08* (2013.01); *F16M 11/2014* (2013.01)

(58) Field of Classification Search
CPC .......................................................... G06F 1/16
See application file for complete search history.

(56) References Cited

U.S. PATENT DOCUMENTS

| | | | |
|---|---|---|---|
| 4,410,158 A | 10/1983 | Maffei |
| 5,288,043 A | 2/1994 | Tigliev |
| D377,897 S | 2/1997 | Vogels |
| 5,609,316 A | 3/1997 | Tigliev |
| D388,646 S | 1/1998 | Canton Gongora et al. |
| D396,862 S | 8/1998 | Morgan |
| D428,863 S | 8/2000 | Rahemtulla et al. |
| D430,165 S | 8/2000 | Lee |
| D430,570 S | 9/2000 | Lee |
| 6,343,006 B1 | 1/2002 | Moscovitch et al. |
| D507,270 S | 7/2005 | Ozolins et al. |
| D527,759 S | 9/2006 | Ono |
| D528,585 S | 9/2006 | Ono |
| D589,511 S | 3/2009 | Han |

(Continued)

OTHER PUBLICATIONS

Office Action from U.S. Appl. No. 29/592,413 dated Dec. 11, 2017, 5 pages.

(Continued)

*Primary Examiner* — Jerry Wu
(74) *Attorney, Agent, or Firm* — Chiesa Shahinian & Giantomasi PC (57) ABSTRACT

A monitor stand comprises a first arm for coupling to a first monitor and a second arm for coupling to a second monitor. The first and second arms are coupled to an upper column of the monitor stand. A lower column of the monitor stand supports the upper column. The first arm, the second arm, and the upper column are configured to rotate around a rotation axis offset from a longitudinal center axis of the lower column to fold or unfold the monitor stand between an open and closed position.

20 Claims, 12 Drawing Sheets

(56) References Cited

U.S. PATENT DOCUMENTS

| | | | |
|---|---|---|---|
| D589,958 S | 4/2009 | Han | |
| D598,458 S | 8/2009 | Li | |
| D598,459 S | 8/2009 | Gillespie | |
| 7,607,620 B2 | 10/2009 | Ozolins et al. | |
| D627,359 S | 11/2010 | Gillespie | |
| D712,906 S | 9/2014 | Wengreen et al. | |
| 9,089,216 B2 | 7/2015 | Liu | |
| D754,669 S | 4/2016 | Jacobs et al. | |
| 9,529,464 B2 | 12/2016 | Sitbon | |
| D779,499 S | 2/2017 | Qian et al. | |
| 2004/0035987 A1* | 2/2004 | Oddsen, Jr. | F16M 11/2092 248/121 |
| 2004/0195471 A1* | 10/2004 | Sachen, Jr. | F16M 11/10 248/127 |
| 2009/0134285 A1* | 5/2009 | Huang | F16M 11/2014 248/124.1 |
| 2015/0342351 A1* | 12/2015 | Hung | F16M 11/22 211/26 |

OTHER PUBLICATIONS

Office Action from U.S. Appl. No. 29/592,416 dated Nov. 2, 2017, 7 pages.

Veneziani, "12 Awesome Things You Can Do with Your Bloomberg Terminal", Business Insider, http://businessinsider.com/12-awesome-things-you-can-do-with-a-bloomberg-terminal-2012-2; Oct. 26, 2017, 1 page.

* cited by examiner

FOLDING MONITOR STAND

CROSS-REFERENCE TO RELATED APPLICATIONS

This application is a continuation of U.S. patent application Ser. No. 15/419,465, filed Jan. 30, 2017, the disclosure of which is incorporated herein by reference in its entirety.

TECHNICAL FIELD

The present invention relates generally to a folding monitor stand and more particularly to a folding monitor stand for dual monitors having a reduced shipping size.

BACKGROUND OF THE INVENTION

Assembling a monitor on a monitor stand is a very cumbersome and time-consuming process, particularly in a business environment where potentially hundreds or thousands of users require monitors mounted on monitor stands. As technology has advanced and costs have decreased, multiple monitor configurations have become increasingly popular, further contributing to this cumbersome and time-consuming assembly process. To address this problem, manufacturers have conventionally delivered monitors pre-assembled on monitor stands. However, delivering monitors pre-assembled on monitor stands requires large shipping boxes, resulting in high shipping costs and a large carbon footprint.

SUMMARY

In accordance with one or more embodiments, a monitor stand includes a first arm for coupling to a first monitor and a second arm for coupling to a second monitor. The first and second arms are coupled to an upper column of the monitor stand. A lower column of the monitor stand supports the upper column. The first and second monitor may include monitor legs that interfere with each other when rotated around a longitudinal center axis of the upper and lower columns. Advantageously, the first arm, the second arm, and the upper column are configured to rotate around a rotation axis offset from the longitudinal center axis of the upper and lower columns to fold or unfold the monitor stand between an open and closed position. In this manner, the monitor stand may be folded without the monitor legs interfering with each other. The monitor stand may therefore be shipped with the monitors pre-assembled on the monitor stand in a relatively small shipping package.

In one or more embodiments, the monitor stand is locked by lowering a cap of the monitor stand, thereby causing a skirt plate of the upper column to be lowered. The cap is in physical communication with the skirt plate via a link rod. The skirt plate is supported by a spring coupled to the retainer of the lower column. Lowering the skirt plate causes the spring to compress, allowing the skirt plate to lower to a lowered position into a lower retainer of the upper column. Lowering the skirt plate thereby causes a first lock pin to lower into a specific one of a plurality of lock holes of the retainer of the lower column thus preventing the rotation of the first arm, the second arm, and the upper column. The specific one of the plurality of lock holes may be different when the monitor stand is in an open position and closed position. In one embodiment, when the monitor stand is in the opened position and the skirt plate is in the lowered position, a second lock pin engages a particular one of the plurality of lock holes of the retainer thus preventing the rotation of the first arm, the second arm, and the upper column. When the monitor stand is in the closed position and the skirt plate is in the lowered position, the second lock pin does not engage any of the plurality of lock holes of the retainer.

In one or more embodiments, the monitor stand is similarly unlocked by raising the cap, thereby causing the skirt plate, and thus the first lock pin, to raise from the specific one of the plurality of lock holes to allow rotation of the first arm, the second arm, and the upper column.

In one or more embodiments, the lower column of the monitor stand includes a retainer having a track. The second arm is coupled to the track such that rotation of the second arm is defined by the track. The rotation of the second arm when folding or unfolding the monitor stand is greater than 90 degrees and the rotation of the first arm and the upper column is greater than 270 degrees. The lower column does not rotate while folding or unfolding the monitor stand.

In one or more embodiments, the upper column comprises an upper retainer coupled to the second arm by a top offset bolt and a lower retainer coupled to the second arm by a bottom offset bolt. The top and bottom offset bolts define the rotation axis.

These and other advantages of the invention will be apparent to those of ordinary skill in the art by reference to the following detailed description and the accompanying drawings.

DETAILED DESCRIPTION

Figure 1:
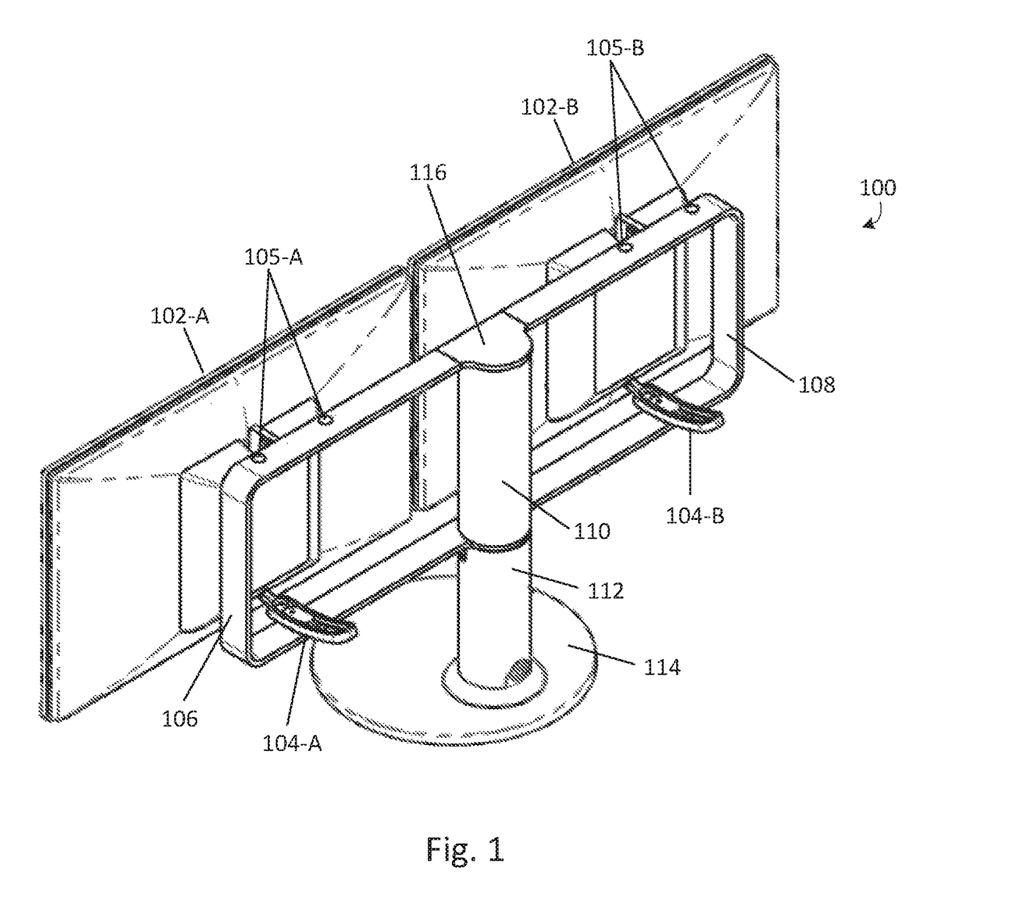
FIG. 1 shows perspective view of a monitor stand in an open or in use position, in accordance with one embodiment.

FIG. 1 shows a perspective view of a folding monitor stand 100 in an open or in use position, in accordance with one or more embodiments. Monitor stand 100 mounts monitors 102-A and 102-B (collectively referred to as monitors 102) for use by a user. Monitors 102 may be mounted on monitor stand 100 using any suitable mounting interface. In an embodiment shown in FIG. 1, monitors 102-A and 102-B are mounted to monitor stand 100 via support holes 105-A and 105-B (collectively referred to as support holes 105) and monitor legs 104-A and 104-B (collectively referred to as monitor legs 104), respectively. Monitor legs 104 allow monitors 102 to tilt vertically to a desired position. Other mounting interfaces may also be employed, such as, e.g., the VESA (video electronics standards association) mounting interface standard.

Monitors 102-A and 102-B mount to first arm 106 and second arm 108 of monitor stand 100, respectively. First arm 106 and second arm 108 are supported by upper column 110 and lower column 112 of monitor stand 100. Lower column 112 of monitor stand 100 is coupled to base 114 for supporting the load of monitors 102. In an embodiment shown in FIG. 1, base 114 is a desktop base configured to sit on top of a desk or other surface. However, it should be understood that base 114 may be any suitable base for supporting monitors 102, such as, e.g., a clamp, a grommet, a wall mount, etc.

Cap 116 is secured to upper column 110 using magnets or any other suitable coupling device for covering an open end of the upper column 110. Raising cap 116 unlocks monitor stand 100 to allow components of monitor stand 100 to rotate between the open (or in use) position shown in FIG. 1 and a closed (or shipping) position. Lowering cap 116 locks monitor stand 100 to prevent the components of monitor stand 100 from rotating once in the open or closed position. The locking and unlocking of monitor stand 100 is described in more detail below.

Figure 2A:
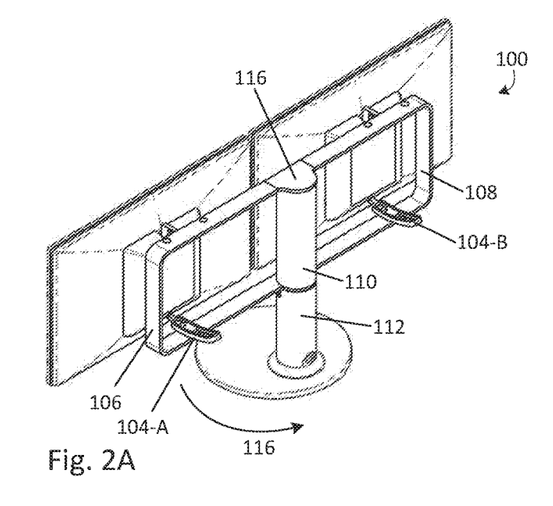
FIG. 2A shows a monitor stand in an open position, in accordance with one embodiment.
Figure 2B:
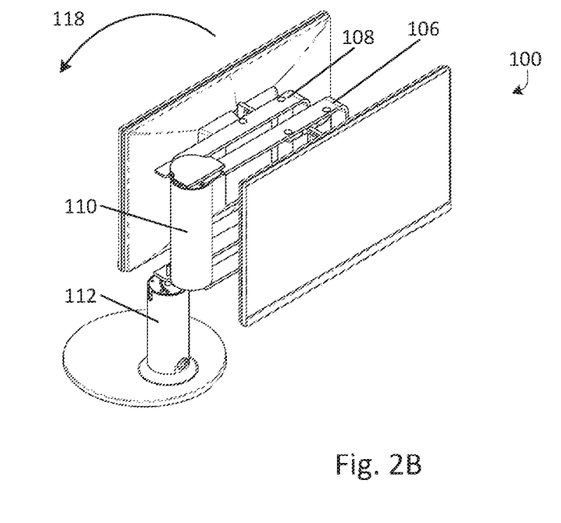
FIG. 2B shows a monitor stand in an intermediate, in rotation position, at the point when a first arm meets a second arm, in accordance with one embodiment.
Figure 2C:
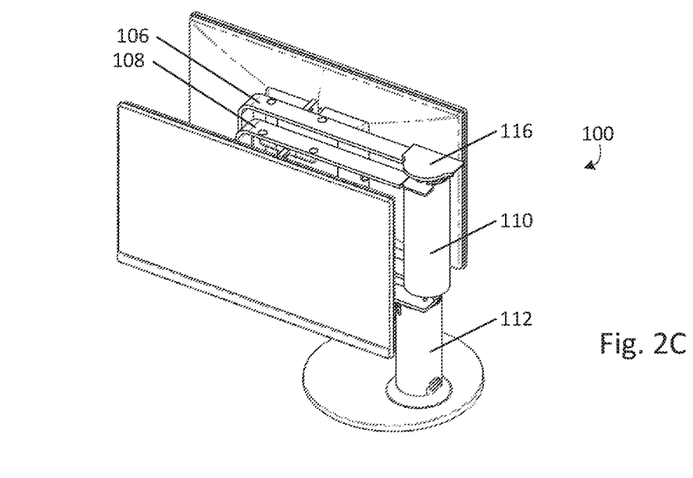
FIG. 2C shows a monitor stand in a closed position, in accordance with one embodiment.

FIGS. 2A-2C show the rotation of the components of monitor stand 100 as monitor stand 100 folds from an open position to a closed position, in accordance with one or more embodiments.

FIG. 2A shows monitor stand 100 in an open position. Cap 116 is raised to unlock monitor stand 100, allowing components of monitor stand 100 to rotate to fold monitor stand 100 to the closed position. First arm 106 and upper column 110 rotate about or around a rotation axis in direction 116 (i.e., in the counterclockwise direction when viewing monitor stand 100 from the top down). The rotation axis is along the longitudinal axis of lower column 112 (and upper column 110 when monitor stand 100 is in the open position). The rotation axis is offset from the longitudinal center axis of upper column 110 and lower column 112. The longitudinal center axis is the longitudinal axis of upper column 110 and lower column 112 at the center of the lateral surface of upper column 110 and lower column 112 (i.e., the center of the cylindrical base of upper column 110 and lower column 112) in the normal direction. Lower column 112 does not rotate. In one embodiment, first arm 106 and upper column 110 are rotated until first arm 106 meets second arm 108, as shown in FIGS. 2A-2C. FIG. 2B shows monitor stand 100 in an intermediate, in rotation position, at the point when first arm 106 meets second arm 108. Rotation of first arm 106, second arm 108, and upper column 110 proceeds in a direction 118 until monitor stand 100 reaches the closed position.

FIG. 2C shows monitor stand 100 in the closed position. Cap 116 is lowered to lock monitor stand 100, preventing the components of monitor stand 100 from rotating to unfold monitors stand 100 to the open position. Advantageously, the offset rotation of monitor stand 100 allows monitor stand 100 to be folded to a closed position without monitor legs 104 interfering with each other to provide a reduced shipping size resulting in lower shipping costs and a smaller carbon footprint. Monitor stand 100 folded to a closed position without monitor legs 104 interfering with each other is further discussed below with respect to FIG. 3A.

While FIGS. 2A-2C show an initial rotation of first arm 106 and upper column 110 followed by a further rotation of first arm 106, second arm 108, and upper column 110, it should be understood that monitor stand 100 may fold from the open position to the closed position using any suitable rotational configuration. For example, in one embodiment, first arm 106, second arm 108, and upper column 110 initially rotate together until second arm 108 reaches its closed position. First arm 106 and upper column 110 then continue to rotate to their closed position to fold monitor stand 100. The rotation of second arm 108 in this manner improves stability of monitor stand 100 by helping to prevent tipping of monitor stand 100. It should be understood that the components of monitor stand 100 may rotated in the reverse order as shown in FIGS. 2A-2C when monitor stand 100 is unfolded from the closed position shown in FIG. 2C to the open position shown in FIG. 2A.

Figure 3A:
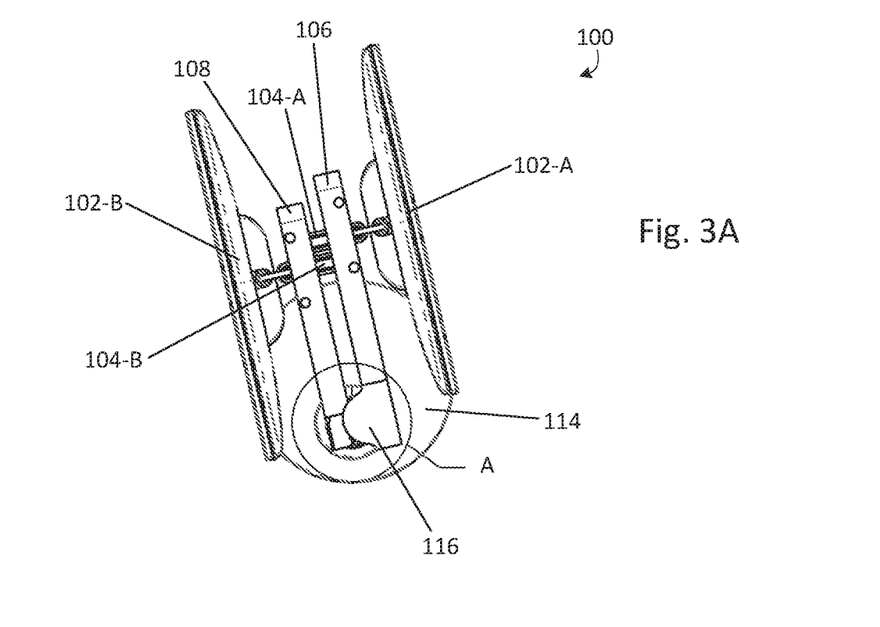
FIG. 3A shows a top down view of a monitor stand in a closed position, in accordance with one embodiment.
Figure 3B:
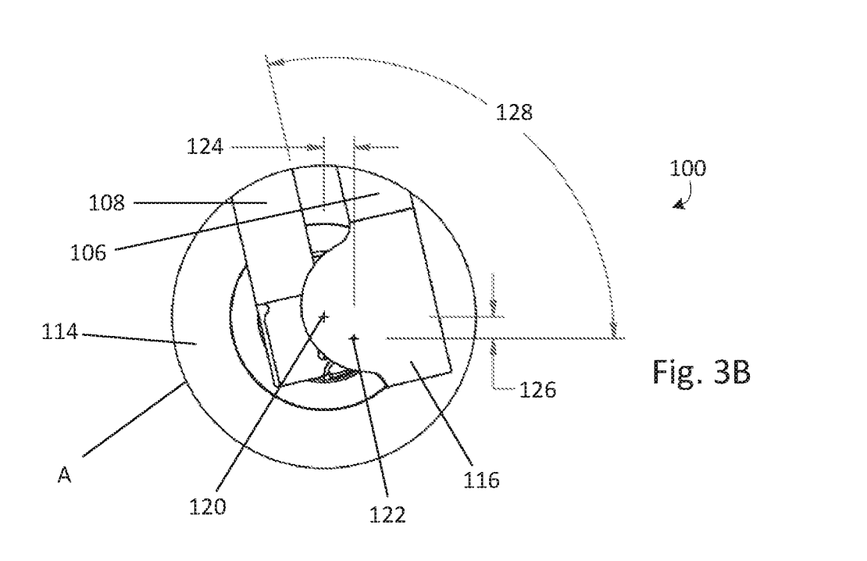
FIG. 3B shows a detailed view of portion A of a monitor stand, as identified in FIG. 3A, in accordance with one embodiment.

FIGS. 3A and 3B show top down views of monitor stand 100 in the closed position, in accordance with one or more embodiments. A detailed view of portion A of monitor stand 100 identified in FIG. 3A is shown in FIG. 3B. Monitor stand 100 in FIGS. 3A and 3B folds to the closed position in accordance with the rotation of components shown in FIGS. 2A-2C. As monitor stand 100 folds to the closed position, first arm 106, second arm 108, and upper column 110 rotate about rotation axis 122. In one embodiment, second arm 108 rotates about rotation axis 122 (from the position shown in FIG. 2B to the position shown in FIG. 2C) by angle of rotation 128. Rotation axis 122 is along the longitudinal axis of lower column 112 (and upper column 110 when monitor stand 100 is in the open position). In one embodiment, angle of rotation 128 is 103 degrees to thereby place monitors 102 over the center of base 114 to provide a smaller packaging volume. However, angle of rotation 128 may be any suitable value.

Rotation axis 122 is offset from center axis 120. Center axis 120 is the longitudinal center axis of upper column 110 and lower column 112. Rotation axis 122 and center axis 120 are shown in FIG. 3B in the normal direction. Rotation axis 122 is offset from center axis 120 on a surface normal to the longitudinal axis in accordance with an X-offset 124 and Y-offset 126. In one embodiment, X-offset 124 is 0.685 inches and Y-offset 126 is 0.5 inches. It should be understood that X-offset 124 and Y-offset 126 may be any suitable value. By offsetting rotation axis 122 from center axis 120, monitor stand 100 may be folded to a closed position without monitor legs 104 interfering with each other, as shown in FIG. 3A, thereby resulting in a reduced shipping size.

Figure 4A:
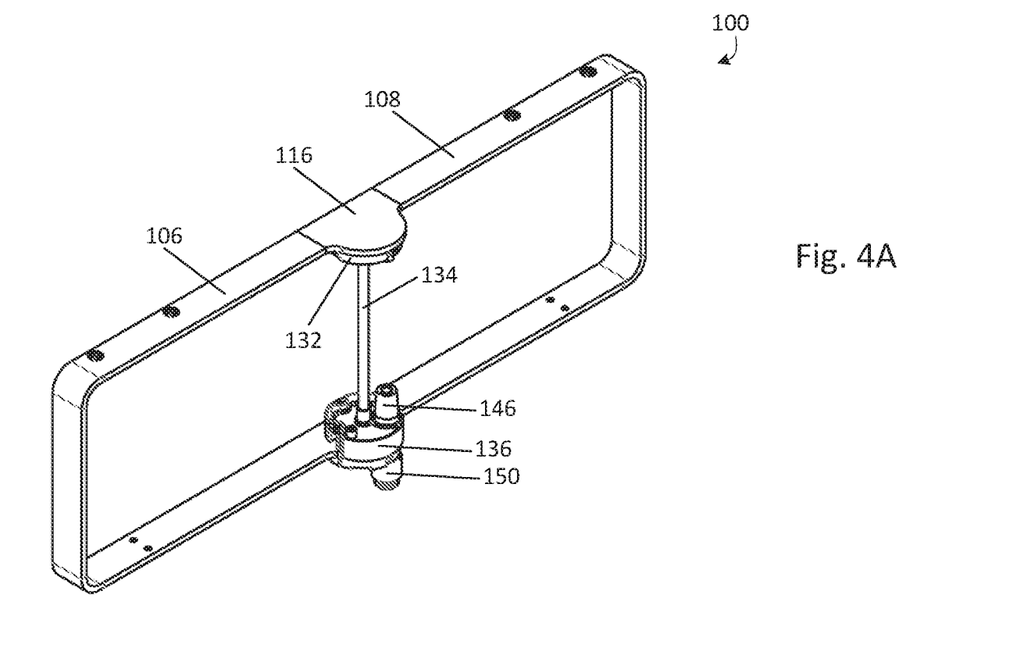
FIG. 4A shows an unlocked monitor stand in an open position with upper and lower columns removed, in accordance with one embodiment.
Figure 4B:
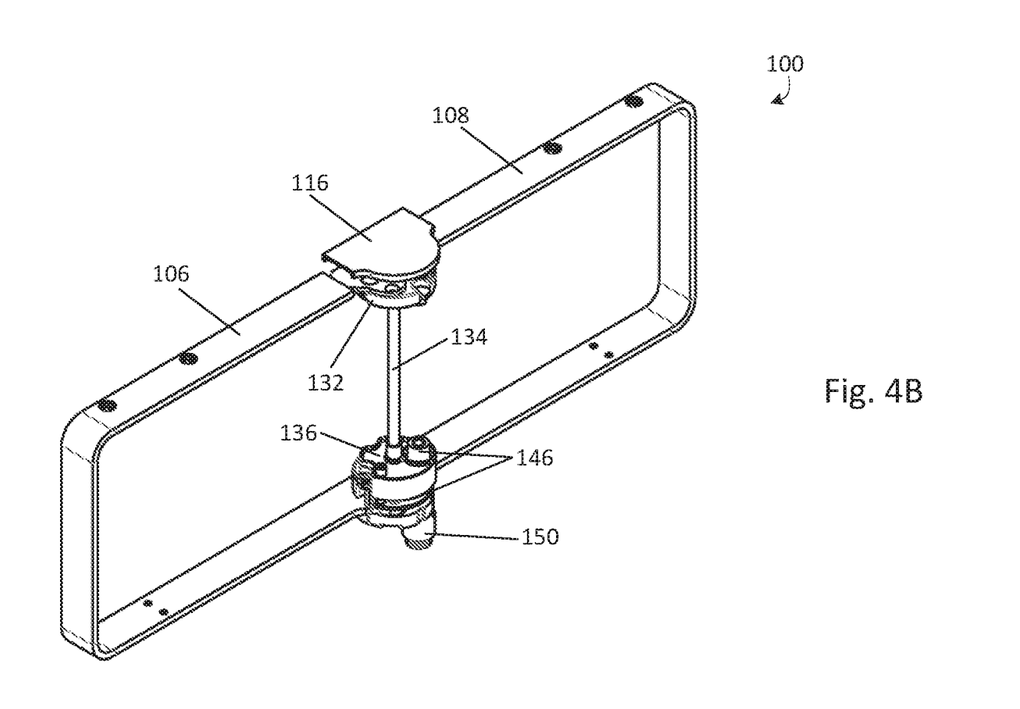
FIG. 4B shows a locked monitor stand in an open position with upper and lower columns removed, in accordance with one embodiment.
Figure 4C:
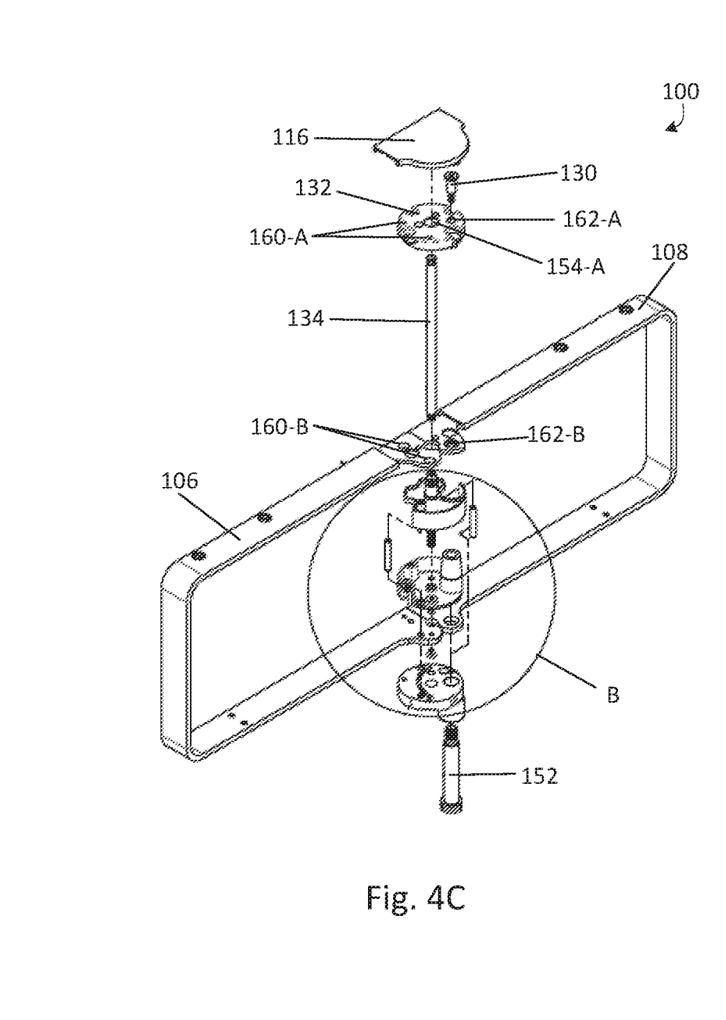
FIG. 4C shows an exploded view of the components of a monitor stand in an open position, in accordance with one embodiment.
Figure 4D:
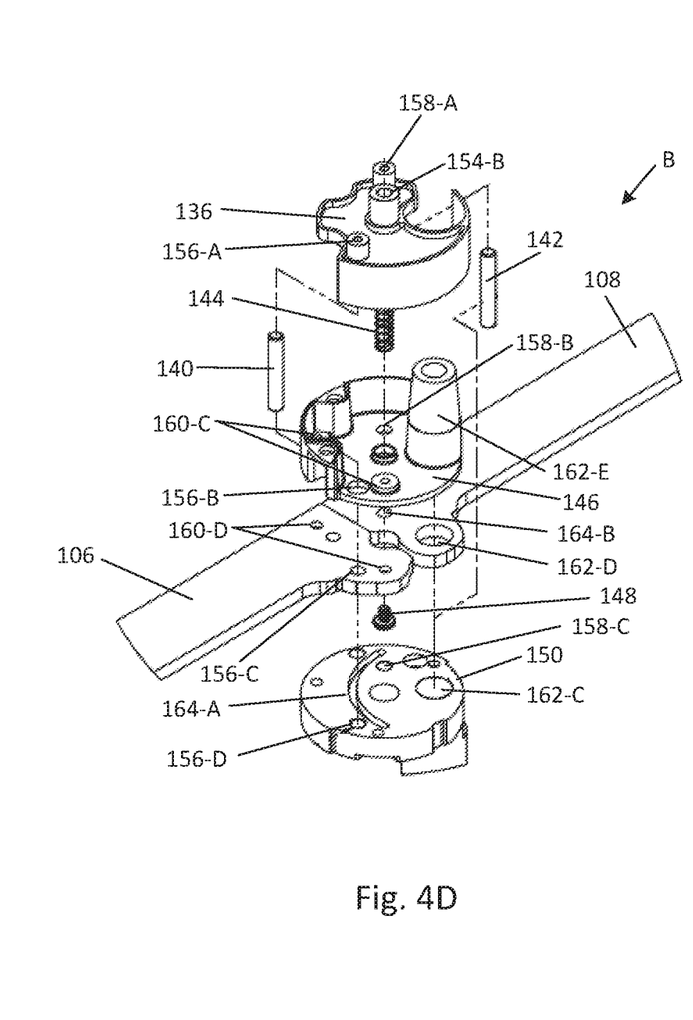
FIG. 4D shows a detailed view of portion B of a monitor stand, as identified in FIG. 4C, in accordance with one embodiment.

FIGS. 4A-4D show monitor stand 100 in the open position with upper column 110 and lower column 112 removed in order to better illustrate the internal components of monitor stand 100, in accordance with one or more embodiments. FIG. 4A shows monitor stand 100 in the locked configuration. Raising cap 116 unlocks monitor stand 100 to allow for rotation of components of monitor stand 100. FIG. 4B shows monitor stand 100 in the unlocked configuration. Lowering cap 116 locks monitor stand 100 to prevent rotation of components of monitor stand 100. FIG. 4C shows an exploded view of the internal components of monitor stand 100 while in the open position. FIG. 4D shows a detailed view of portion B, identified in FIG. 4C.

With reference to FIGS. 4A-4D, internal components of monitor stand 100 are shown. Components of upper column 110 include link rod 134, skirt plate 136, first lock pin 140, second lock pin 142, and lower retainer 146. Components of lower column 112 include retainer 152.

Upper portions of first arm 106 are coupled to upper retainer 132 of upper column 110 via a coupling device through holes 160-A of upper retainer 132 and holes 160-B of first arm 106. The coupling device may be any suitable coupling device, such as, e.g., bolts or screws. Lower portions of first arm 106 are coupled to lower retainer 146 of upper column 110 via a coupling device through holes 160-C of lower retainer 146 to upper column 110 and holes 160-D of first arm 106.

Upper portions of second arm 108 are coupled to upper retainer 132 via top offset bolt 130 through hole 162-A of upper retainer 132 and hole 162-B through second arm 108. Lower portions of second arm 108 are coupled to lower retainer 146 of upper column 110 and retainer 150 of lower column 112 via bottom offset bolt 152 through hole 162-C of retainer 150, hole 162-D through second arm 108, and hole 162-E through lower retainer 146. Second arm 108 is further coupled to retainer 150 of lower column 112 via a coupling device though track 164-A of retainer 150 and hole 164-B through second arm 108.

During the folding of monitor stand 100, first arm 106, second arm 108, and upper column 110 rotate around rotation axis 122 (FIG. 3B). Rotation axis 122 is defined by top offset bolt 130 and bottom offset bolt 152. Upper column 110 is only directly coupled to retainer 150 of lower column 112 by bottom offset bolt 152, allowing first arm 106, second arm 108, and upper column 110 to rotate around rotation axis 122 offset from longitudinal center axis 120. Bottom offset bolt 152 is directly coupled to lower retainer 146 and hole 162-E, and rotates within retainer 150 of lower column 112. Top offset bolt 130 acts as a support to vertically align second arm 108. Due to the coupling of second arm 108 with track 164-A (via a coupling device through hole 164-B), track 164-A limits the rotation of second arm 108 to define angle of rotation 128.

Monitor stand 100 is placed in the locked configuration, as shown in FIG. 4A, by lowering cap 116. Cap 116 is coupled to (e.g., via magnets, screws, etc.) an upper end of link rod 134 through center hole 154-A of upper retainer 132, as shown in FIG. 4C. A lower end of link rod 134 is coupled to receiving hole 154-B of skirt plate 136. Skirt plate 136 is coupled to first lock pin 140 via receiving hole 156-A and second lock pin 142 via receiving hole 158-A. Skirt plate 136 is held above lower retainer 146 via spring 144, which is coupled to lower retainer 146 by screw 148. By lowering cap 116 (to place monitor stand 100 in the locked configuration), skirt plate 136 is lowered (via link rod 134) from a raised position to a lowered position to fit within lower retainer 146 by compressing spring 144. Lowering skirt plate 136 allows first lock pin 140 to engage lock hole 156-D of retainer 150 and second lock pin 142 to engage lock hole 158-C of retainer 150, thereby preventing rotation of monitor stand 100.

In one embodiment, cap 116 includes a cap stop to limit how much cap 116 may be raised and lowered. In one embodiment, the surface of upper retainer 132 acts as the cap stop to limit travel of cap 116. Once cap 116 is lowered, the cap stop may be engaged to prevent cap 116 from being raised due to the compressive force of spring 144.

Monitor stand 100 is placed in the unlocked configuration, as shown in FIG. 4B, by raising cap 116 to thereby raise skirt plate 136 (via link rod 134). Skirt plate 136 is held above lower retainer 146 by spring 144. In one embodiment, spring 144 provides sufficient force to hold skirt plate 136 at a height such that first lock pin 140 does not engage lock hole 156-D of retainer 150 but remains engaged with locks holes 156-B and 156-C and second lock pin 142 does not engage lock hole 158-C of retainer 150 but remains engaged with lock hole 158-B. In this manner, raising skirt plate 136 allows rotation of monitor stand 100. In one embodiment, spring 144 is at its resting position when monitor stand 100 is in the unlocked configuration. In another embodiment, spring 144 is held in a semi-compressed state by the cap stop when monitor stand 100 is in the unlocked configuration.

Figure 5A:
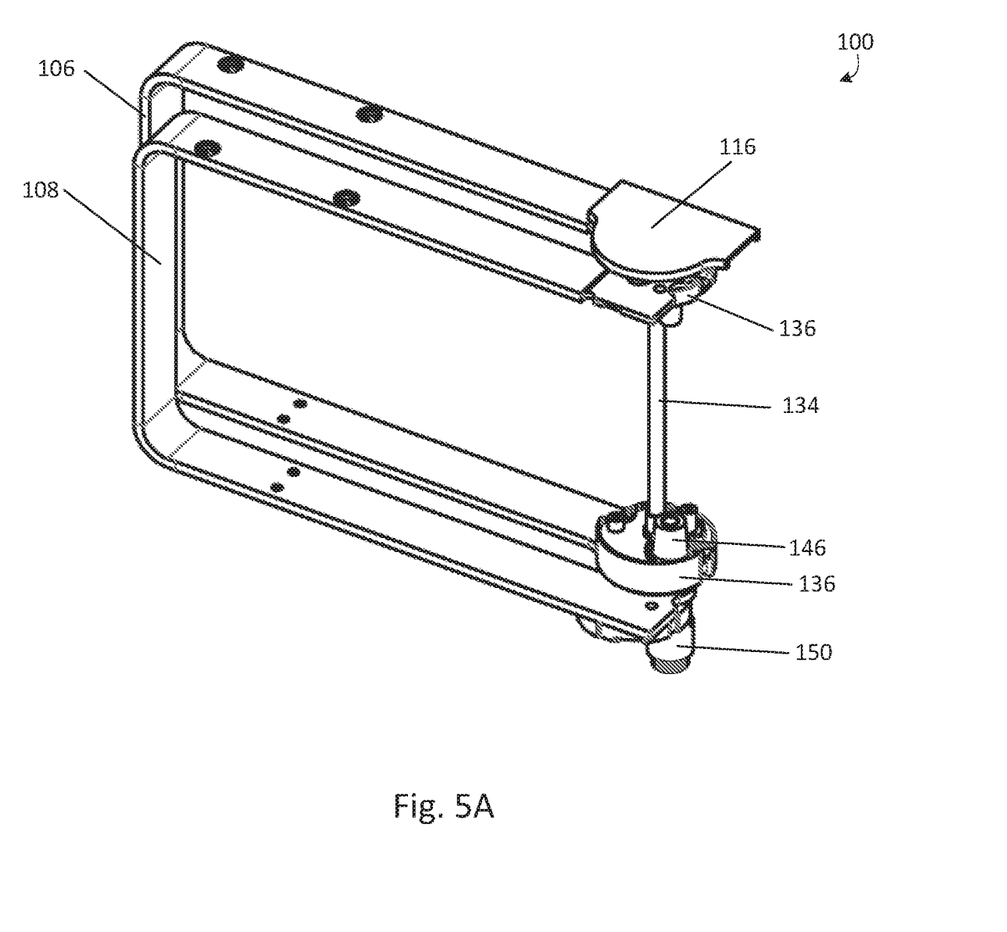
FIG. 5A shows a locked monitor stand in closed position with upper and lower columns removed, in accordance with one embodiment.
Figure 5B:
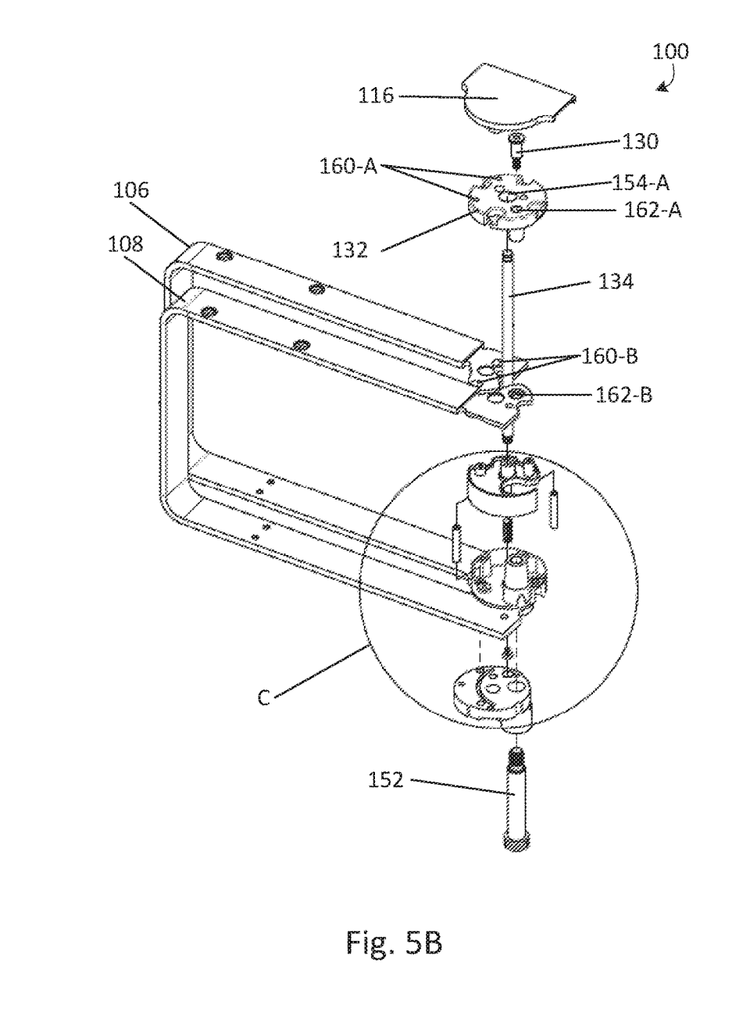
FIG. 5B shows an exploded view of the components of a monitor stand in a closed position, in accordance with one embodiment.
Figure 5C:
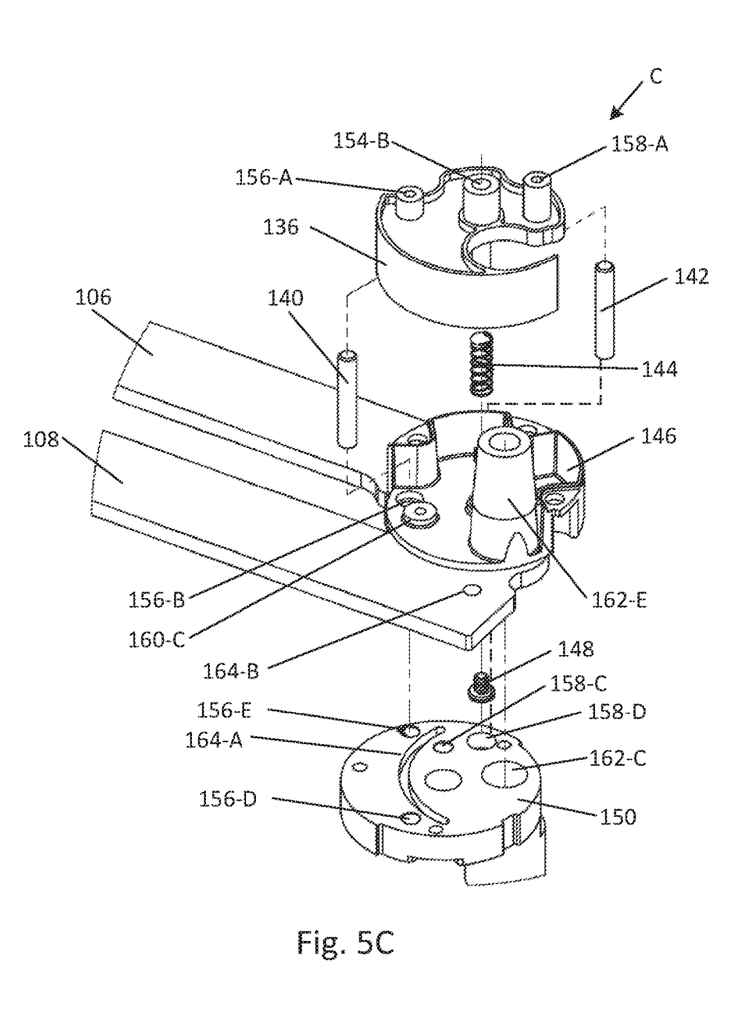
FIG. 5C shows a detailed view of portion C of a monitor stand, as identified in FIG. 5B, in accordance with one embodiment.

FIGS. 5A-5C show monitor stand 100 in the closed position with upper column 110 and lower column 112 removed in order to better illustrate the internal components of monitor stand 100, in accordance with one or more embodiments. FIG. 5A shows monitor stand 100 in the locked configuration. FIG. 5B shows an exploded view of the internal components of monitor stand 100 while in the closed position. FIG. 5C shows a detailed view of portion C, identified in FIG. 5B.

With reference to FIGS. 5A-5C, monitor stand 100 may be locked and unlocked while in the closed position by lowering and raising cap 116, respectively. Similar to monitor stand 100 in the open position (FIGS. 4A-4D), monitor stand 100 in the closed position shown in FIGS. 5A-5C is locked by lowering cap 116, thereby lowering skirt plate 136 (via link rod 134) and engaging first lock pin 140 with one of the lock holes in lower retainer 150. However, due to the rotation of the components of upper column 110 while retainer 150 of lower column 112 remains stationary, rather than first lock pin 140 engaging lock hole 156-D of retainer 150 as when monitor stand 100 is in the open position, first lock pin 140 instead engages lock hole 156-E. Second lock pin 142 does not engage any of the lock holes in retainer 150 in the closed position.

Figure 6A:
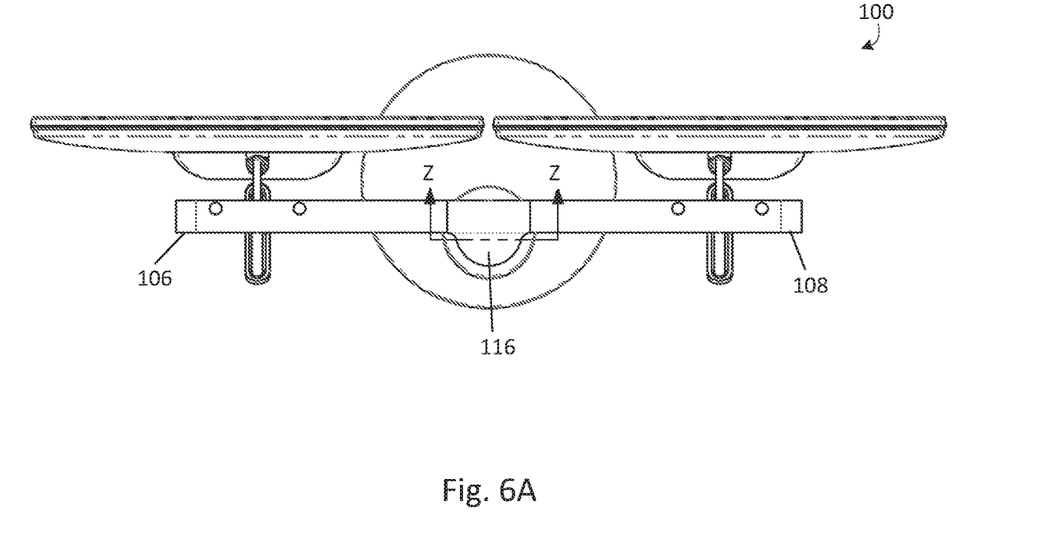
FIG. 6A shows a top down view of a monitor stand in an open position identifying cross-sectional plane Z-Z, in accordance with one embodiment.

FIG. 6A shows a top down view of monitor stand 100 in the open position, in accordance with one or more embodiments. Cross-sectional plane Z-Z of monitor stand 100 is identified in FIG. 6A.

Figure 6B:
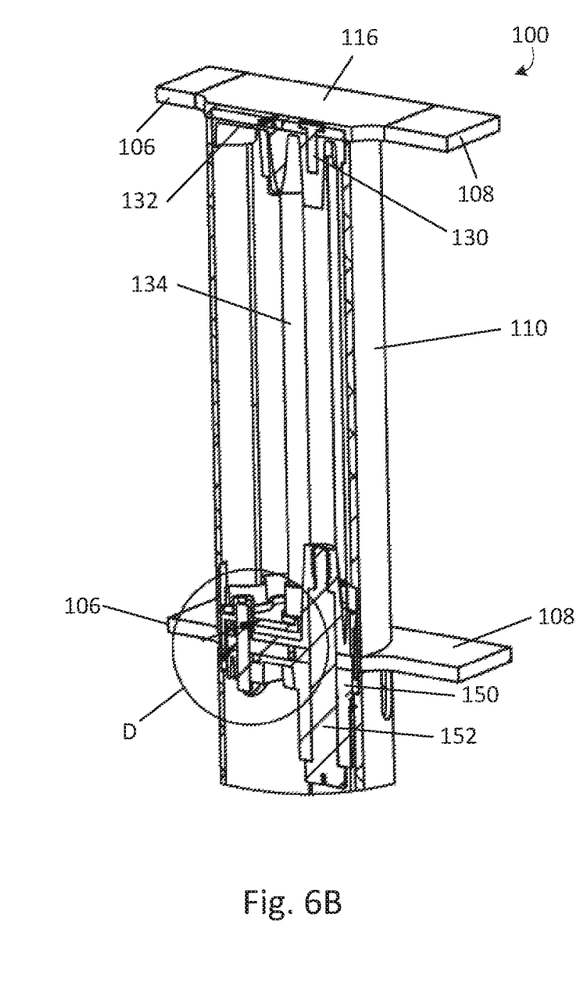
FIG. 6B shows a cross-section view of the monitor stand shown in FIG. 6A in a locked configuration at plane Z-Z, in accordance with one embodiment.
Figure 6C:
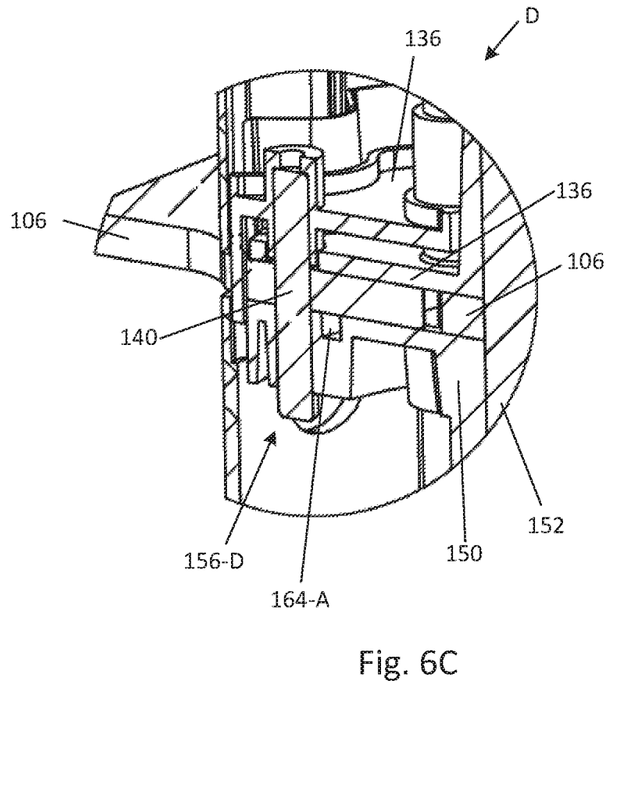
FIG. 6C shows a detailed view of portion D of a monitor stand, as identified in FIG. 6B, in accordance with one embodiment.

FIG. 6B shows a cross-sectional view of the monitor stand 100 shown in FIG. 6A in a locked configuration at plane Z-Z, in accordance with one or more embodiments. FIG. 6C shows a detailed view of portion D, identified in FIG. 6B. As shown in FIGS. 6B and 6C, cap 116 is lowered to place monitor stand 100 in the locked configuration by lowering skirt plate 136 within lower retainer 146 and thereby engaging first lock pin 140 with hole 156-D of retainer 150 of lower column 112. First lock pin 140 engaged with hole 156-D of retainer 150 prevents rotation of the components of upper column 110. Second lock pin 142 is similarly engaged with hole 158-C (not shown in FIGS. 6D and 6E).

Figure 6D:
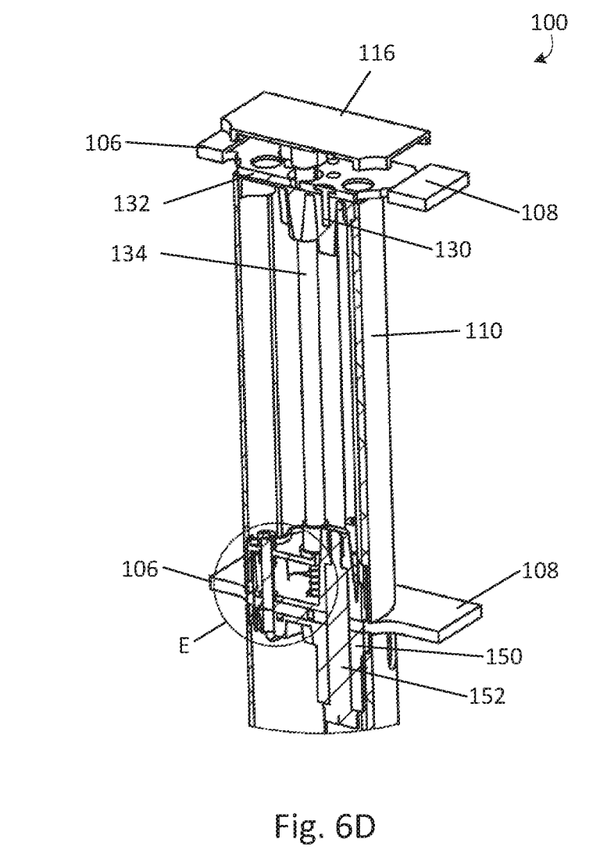
FIG. 6D shows a cross-sectional view of the monitor stand shown in FIG. 6A in an unlocked configuration at plane Z-Z, in accordance with one embodiment.
Figure 6E:
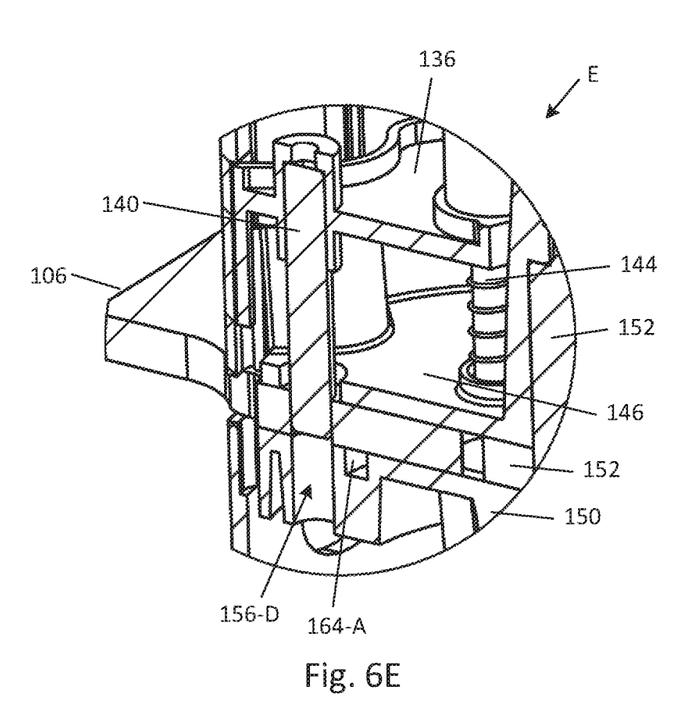
FIG. 6E shows a detailed view of portion E of a monitor stand, as identified in FIG. 6D, in accordance with one embodiment.

FIG. 6D shows a cross-sectional view of the monitor stand 100 shown in FIG. 6A in an unlocked configuration at plane Z-Z, in accordance with one or more embodiments. FIG. 6E shows a detailed view of portion E, identified in FIG. 6D. As shown in FIGS. 6D and 6E, cap 116 is raised to place monitor stand 100 in the unlocked configuration by raising skirt plate 136 above lower retainer 146 to thereby disengage first lock pin 144 with hole 156-D of retainer 150 of lower column 112. First lock pin 140 disengaged with hole 156-D of retainer 150 allows rotation of the components of upper column 110, while remaining engaged with hole 156-B of lower retainer 146 and hole 156-C of first arm 106 to allow rotation of these components of upper column 110 together. Second lock pin 142 is similarly disengaged with hole 158-C (not shown in FIGS. 6D and 6E).

Figure 7A:
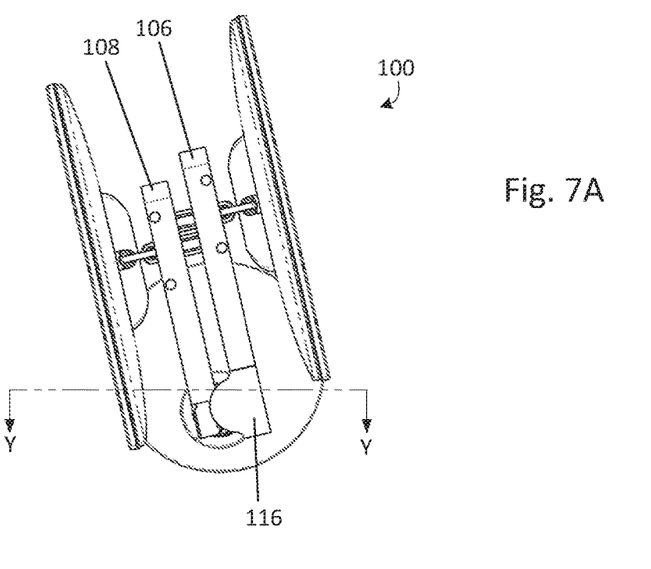
FIG. 7A shows a top down view of a locked monitor stand in a closed position identifying cross-sectional plane Y-Y, in accordance with one embodiment.
Figure 7B:
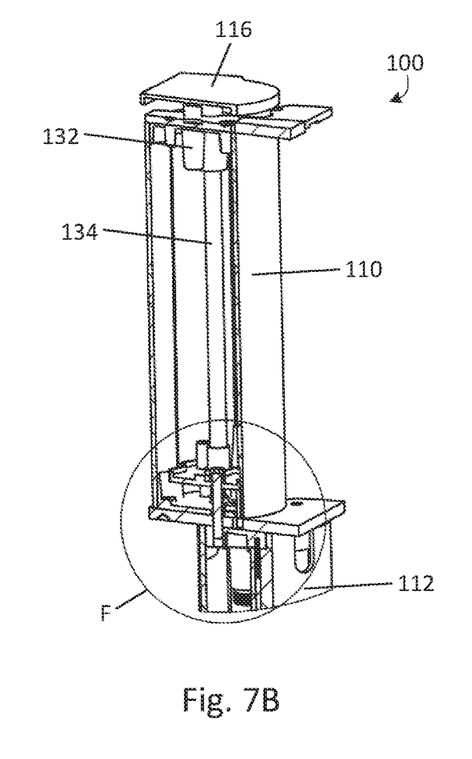
FIG. 7B shows a cross-section view of the monitor stand shown in FIG. 7A at plane Y-Y, in accordance with one embodiment.
Figure 7C:
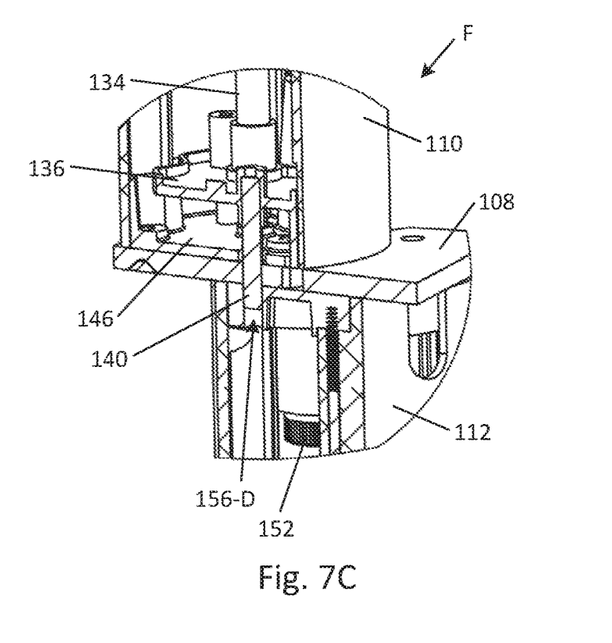
FIG. 7C shows a detailed view of portion F of a monitor stand, as identified in FIG. 7B, in accordance with one embodiment.

FIG. 7A shows a top down view of monitor stand 100 in a closed position and locked configuration, in accordance with one or more embodiments. Cross-sectional plane Y-Y of monitor stand 100 is identified in FIG. 7A. FIG. 7B shows a cross-sectional view of the monitor stand 100 shown in FIG. 7A at plane Y-Y. FIG. 7C shows a detailed view of portion F, identified in FIG. 7B. As shown in FIGS. 7A-7C, monitor stand 100 is in a closed position with cap 116 lowered to lock monitor stand 100. Lowering cap 116 lowers skirt plate 136 at least partly within lower retainer 146 to thereby engage first lock pin 140 with hole 156-D of retainer 150 of lower column 112. First lock pin 140 engaged with hole 156-D of retainer 150 prevents rotation of the components of upper column 110. Second lock pin 142 does not engage any of the lock holes of retainer 150 when monitor stand 100 is in the closed position.

Advantageously, embodiments of monitor stand 100 described herein provide for rotation axis 120 of monitor stand 100 offset from the center axis 120, allowing monitor stand 100 to be folded with monitors 102 to a closed position without monitor legs 104 interfering with each other. In this manner, monitor stand 100 may be shipped with a reduced shipping size, lowering shipping costs and reducing its carbon footprint.

Figure 8:
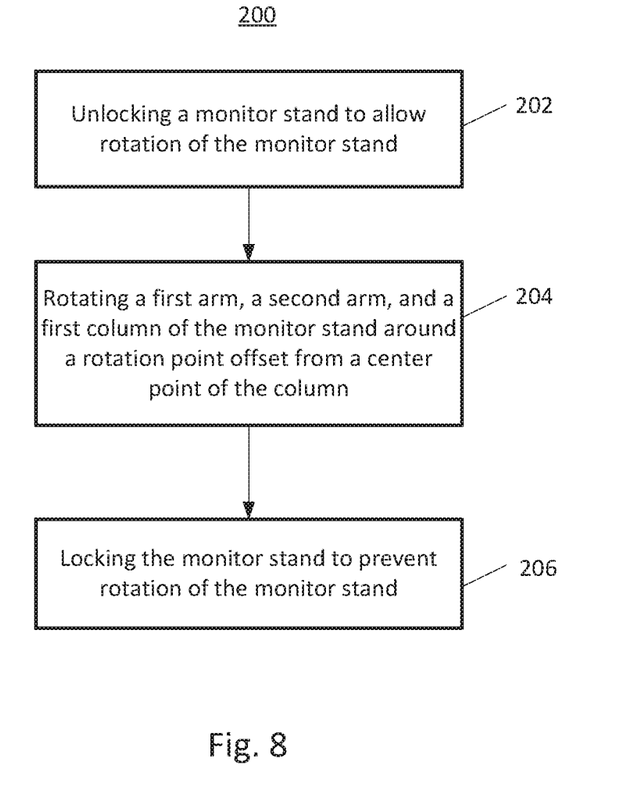
FIG. 8 shows a method for folding or unfolding a monitor stand, in accordance with one embodiment.

FIG. 8 shows a flow diagram of a method 200 for folding or unfolding a monitor stand, in accordance with one or more embodiments. Method 200 will be discussed with reference to monitor stand 100 shown in FIGS. 1-7C.

At step 202, monitor stand 100 is unlocked to allow rotation of the component of monitor stand 100. Monitor stand 100 is unlocked by raising cap 116, thereby causing skirt plate 136 to be raised. Skirt plate 136 is supported by spring 144 coupled to retainer 150 of lower column 112. Raising skirt plate 136 causes spring 144 to relax (at least in part), allowing skirt plate 136 to raise above lower retainer 146. Raising skirt plate 136 thereby causes first lock pin 140 to raise out of its specific one of a plurality of lock holes of retainer 150. The one of the plurality of lock holes may be different when monitor stand 100 is in an open position and a closed position. In one embodiment, when monitor stand 100 is in an open position, the one of the plurality of lock holes is hole 156-D. In another embodiment, when monitor stand 100 is in a closed position, the one of the plurality of lock holes is hole 156-E.

In one embodiment, when monitor stand 100 is in the open position, raising skirt plate 136 causes second lock pin 142 to raise out of a particular one of the plurality of lock holes of retainer 150. The particular one of the plurality of lock holes may be hole 158-C. When monitor stand 100 is in the closed position, second lock pin 142 is not engaged any of the plurality of lock holes of retainer 150.

At step 204, first arm 106, second arm 108, and a first column (i.e., upper column 110) are rotated around rotation axis 122 offset from longitudinal center axis 120 of the column to fold or unfold monitor stand 100 to an open or closed position. Rotation axis is 122 defined by top offset bolt 130 and bottom offset bolt 152. The rotation of second arm 108 is defined by track 164-A. In one embodiment, second arm 108 rotates greater than 90 degrees and first arm 106 rotates greater than 270 degrees. Lower column 112 does not rotate while folding monitor stand 100.

At step 206, monitor stand 100 is locked to prevent rotation of the components of monitor stand 100. Monitor stand 100 is locked by lowering cap 116, thereby causing skirt plate 136 to lower and first lock pin 140 (and second lock pin 142 when monitor stand 100 is in the open position) to lower into a different one of the plurality of lock holes to prevent rotation of first arm 106, second arm 108, and upper column 110.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A monitor stand comprising:
 a first arm for coupling to a first monitor;
 a second arm for coupling to a second monitor;
 an upper column supporting the first and second arms; and
 a lower column supporting the upper column,
 wherein the first arm, the second arm, and the upper column are configured to rotate around a single rotation axis offset from a longitudinal center axis of the lower column to fold or unfold the monitor stand between an open position and a closed position while the lower column does not rotate.

2. The monitor stand of claim 1, wherein the second arm is further coupled to a track of a retainer of the lower column, the rotation of the second arm being defined by the track.

3. The monitor stand of claim 1, the upper column comprising:

an upper retainer coupled to the second arm by a top offset bolt; and a lower retainer coupled to the second arm by a bottom offset bolt, wherein the top and bottom offset bolts define the rotation axis.

4. The monitor stand of claim 1, wherein the monitor stand comprises a cap configured to be lowered, causing a skirt plate of the upper column to be lowered to a lowered position, to thereby lower a first lock pin into a specific one of a plurality lock holes of a retainer of the lower column and lock the monitor stand.

5. The monitor stand of claim 4, wherein:

when the monitor stand is in the open position and the skirt plate is in the lowered position, a second lock pin coupled to the skirt plate is engaged with a particular one of the lock holes of the retainer of the lower column; and when the monitor stand is in the closed position and the skirt plate is in the lowered position, the second lock pin is not engaged with any of the lock holes of the retainer of the lower column.

6. The monitor stand of claim 4, wherein the specific one of the lock holes is different when the monitor stand is in the open position and the closed position.

7. The monitor stand of claim 4, wherein the upper column further comprises:

a link rod coupled to the cap at a first end and the skirt plate at a second end.

8. The monitor stand of claim 4, wherein the upper column further comprises:

a lower retainer coupled to a spring for supporting the skirt plate, wherein the skirt plate is configured to be lowered into the lower retainer by compressing the spring.

9. The monitor stand of claim 1, wherein the rotation of the second arm is greater than 90 degrees.

10. A monitor stand comprising:

a first arm coupled to a first monitor;

a second arm coupled to a second monitor;

an upper column supporting the first and second arms; and a lower column supporting the upper column, wherein the first arm, the second arm, and the upper column are configured to rotate around a single rotation axis offset from a longitudinal center axis of the upper column to fold or unfold the monitor stand between an open position and a closed position while the lower column does not rotate.

11. The monitor stand of claim 10, wherein the second arm is further coupled to a track of a retainer, the rotation of the second arm being defined by the track.

12. The monitor stand of claim 11, wherein the monitor stand comprises a cap configured to be lowered, causing a skirt plate of the upper column to be lowered, to thereby lower a first lock pin into a specific one of a plurality of lock holes of the retainer and lock the monitor stand.

13. The monitor stand of claim 12, wherein the specific one of the lock holes is different when the monitor stand is in the open position and the closed position.

14. A method for folding or unfolding a monitor stand, comprising:

unlocking a monitor stand to allow rotation of the monitor stand;

rotating a first arm, a second arm, and a first column of a monitor stand around a single rotation axis offset from a longitudinal center axis of a second column while the second column does not rotate, the first column supporting the first and second arms and the second column supporting the first column; and locking the monitor stand to prevent rotation of the monitor stand.

15. The method of claim 14, wherein:

the first column is a first upper column, the second column is a second lower column; and the second arm is coupled to a track of a retainer of the second lower column such that the rotation of the second arm is defined by the track.

16. The method of claim 15, wherein unlocking a monitor stand comprises:

raising a cap of the monitor stand thereby causing a skirt plate of the first upper column to raise, thereby causing a first lock pin to raise out of a specific one of a plurality of lock holes of the retainer.

17. The method of claim 15, wherein locking the monitor stand comprises:

lowering a cap of the monitor stand thereby causing a skirt plate of the first upper column to lower, the skirt plate coupled to a first lock pin, wherein the causing the skirt plate to lower causes the first lock pin to lower into a specific one of a plurality of lock holes of the retainer to prevent rotation of the first arm, the second arm, and the first upper column.

18. The method of claim 17, wherein:

when the monitor stand is in an open position, causing the skirt plate to lower further causes a second lock pin coupled to the skirt plate to lower into a particular one of the plurality of lock holes of the retainer; and when the monitor stand is in a closed position, causing the skirt plate to lower does not engage the second lock pin with any of the plurality of lock holes of the retainer.

19. The method of claim 17, wherein the specific one of the plurality of lock holes is different when the monitor stand is in an open position and a closed position.

20. The method of claim 17, wherein lowering a cap of the monitor stand thereby causing a skirt plate of the first upper column to lower comprises:

lowering the skirt plate into a lower retainer of the first upper column by compressing a spring supporting the skirt plate.

* * * * *